(12) United States Patent
Tamura

(10) Patent No.: US 6,754,849 B2
(45) Date of Patent: Jun. 22, 2004

(54) METHOD OF AND APPARATUS FOR TESTING CPU BUILT-IN RAM MIXED LSI

(75) Inventor: Hiroaki Tamura, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 452 days.

(21) Appl. No.: 09/904,507

(22) Filed: Jul. 16, 2001

(65) Prior Publication Data

US 2002/0129298 A1 Sep. 12, 2002

(30) Foreign Application Priority Data

Mar. 9, 2001 (JP) ........................................ 2001-067334

(51) Int. Cl.[7] .............................................. G11C 29/00
(52) U.S. Cl. ............................ 714/30; 714/25; 714/42; 714/718
(58) Field of Search ............................ 714/30, 25, 42, 714/718, 719

(56) References Cited

U.S. PATENT DOCUMENTS

| | | | | |
|---|---|---|---|---|
| 5,287,455 A | * | 2/1994 | Rosenthal | 709/253 |
| 5,384,784 A | * | 1/1995 | Mori et al. | 714/718 |
| 5,825,784 A | * | 10/1998 | Spaderna et al. | 714/724 |
| 5,933,594 A | * | 8/1999 | La Joie et al. | 714/26 |
| 6,000,048 A | * | 12/1999 | Krishna et al. | 714/718 |
| 6,246,618 B1 | * | 6/2001 | Yamamoto et al. | 365/200 |
| 6,343,366 B1 | * | 1/2002 | Okitaka | 714/733 |
| 6,574,626 B1 | * | 6/2003 | Regelman et al. | 707/6 |

FOREIGN PATENT DOCUMENTS

| | | |
|---|---|---|
| EP | 0 889 479 | 1/1999 |
| JP | 6-207970 | 7/1994 |
| JP | 2000-305799 | 11/2000 |

* cited by examiner

Primary Examiner—Robert Beausoliel
Assistant Examiner—Yolanda L Wilson
(74) Attorney, Agent, or Firm—Leydig, Voit & Mayer, Ltd.

(57) ABSTRACT

A test apparatus includes a switch switched towards the ROM under the control of a signal output from the tester. When the switch is switched towards the ROM, the computer program for carrying out the self test is loaded in the main memory and the CPU performs the test using this computer program.

8 Claims, 5 Drawing Sheets

METHOD OF AND APPARATUS FOR TESTING CPU BUILT-IN RAM MIXED LSI

FIELD OF THE INVENTION

This invention relates to a method of and apparatus for testing a CPU built-in RAM mixed LSI using a BOST (Built Out Self Test) board.

BACKGROUND OF THE INVENTION

Conventionally, in order to attain miniaturization, high speed and low power consumption of electronic equipments, attention has been paid to a technique relating to a CPU built-in RAM mixed LSI ("LSI") in which RAM, such as DRAM and SRAM, an CPU, manufactured individually, are mounted onto one chip. Before use thereof, it is necessary to test such an LSI.

Conventionally, when testing the LSI, the LSI for test is mounted onto a test board, and respective signal terminals, power-supply terminals, and the like of the LSI are connected to corresponding terminals of a tester so that predetermined signals are directly output from the tester to the LSI.

However, in the above-mentioned conventional test method, a memory in the LSI is directly accessed via a circuit in the tester that is dedicated to the test. This method of accessing the memory is different from the method with which the memory in the LSI is normally accessed. Precisely, in a normal case the memory is accessed through a CPU built in LSI, however, during the test the memory is accessed from the test dedicated circuit in the tester, i.e. not through the CPU in LSI. As mentioned above, in the conventional method, since the method of accessing the memory at the time of the test is different from the method of accessing the memory at the time of the normal LSI operation, defective products cannot be screened completely, and thus test accuracy is not good.

In addition, in the case where an operating frequency of the tester is lower than the operating frequency of the LSI, since the test is conducted with a lower frequency than that of the normal LSI operation, defective products cannot be screened completely. Therefore, in order to conduct an accurate test, the tester itself is changed so as to cope with the operating frequency of the LSI. This raises testing costs.

SUMMARY OF THE INVENTION

It is an object of the present invention to provide a method of and apparatus for testing CPU built-in RAM mixed LSI which allows the LSI to be tested through the built-in CPU.

In the present invention, the tester outputs a switching signal and an another signal. A ROM and a switching unit are mounted on the test board. The ROM stores a computer program which when executed makes it possible to conduct the self test by an access from said CPU of said LSI to said mixed RAM. The switching unit operates based on the switching signal output by the tester and establishes a signal path between the LSI to be tested and the another signal output terminal of said tester, or said ROM. When the switching unit establishes a signal path between the LSI and the ROM, the CPU of the LSI loads the computer program stored in the ROM into a main memory. Thus, the computer program stored in the ROM can be directly loaded into the main memory, and the self test can be performed by the CPU by accessing the mixed RAM.

Other objects and features of this invention will become apparent from the following description with reference to the accompanying drawings.

DESCRIPTION OF THE PREFERRED EMBODIMENTS

Preferred embodiments of the method and apparatus according to the present invention will be explained in detail below with reference to the accompanying drawings.

Figure 1:
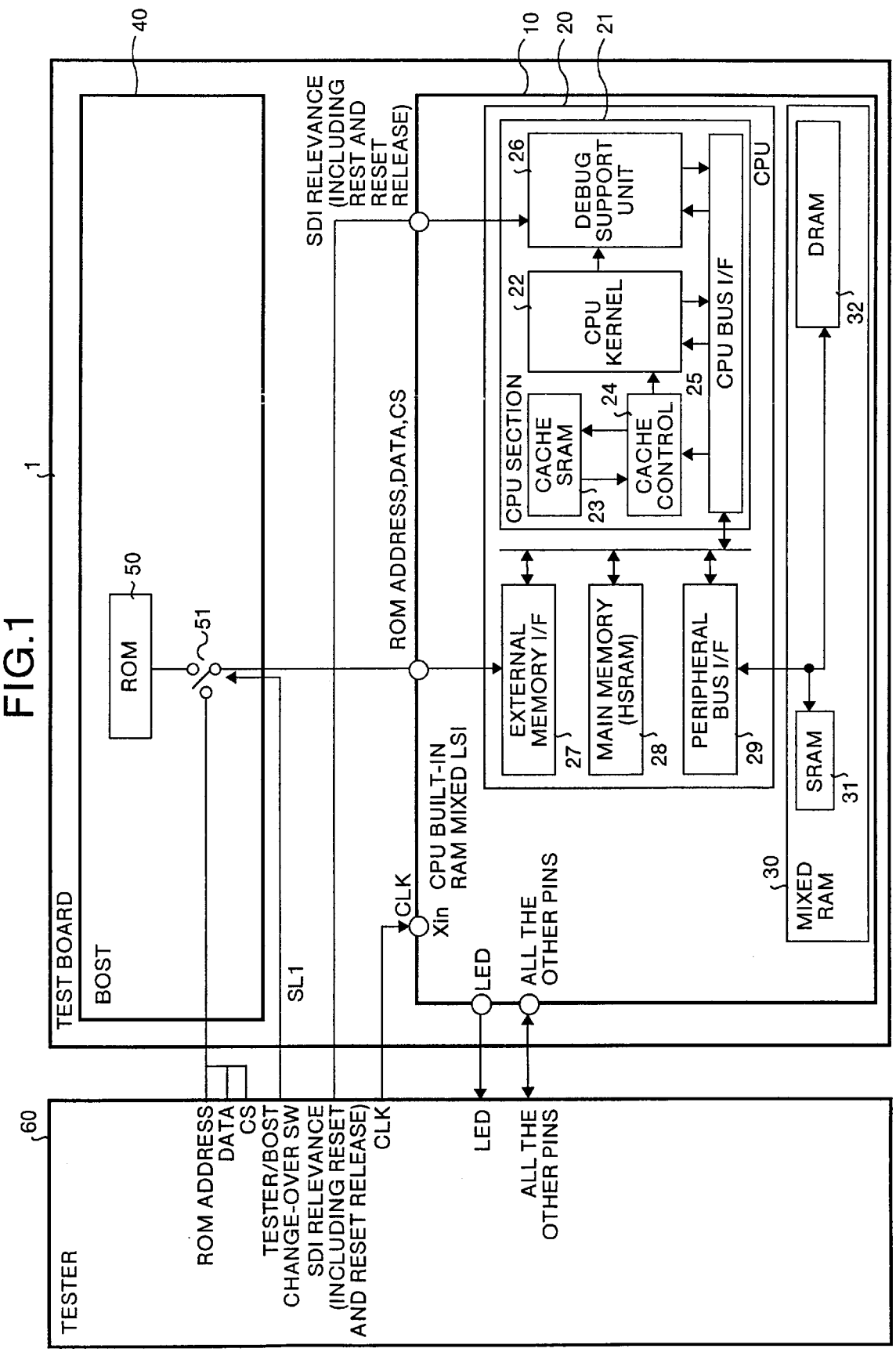
FIG. 1 is a block diagram showing a structure of a test apparatus of a CPU built-in RAM mixed LSI according to a first embodiment of the present invention.

The first embodiment will be explained with reference to FIG. 1 and FIG. 2. FIG. 1 shows an outline of the apparatus allows the CPU built-in RAM mixed LSI to be tested through the built-in CPU.

The CPU built-in RAM mixed LSI 10 and the BOST circuit 40 are mounted onto the test board 1. The CPU built-in RAM mixed LSI 10 comprises the CPU 20, SRAM (static RAM) 31, DRAM (Dynamic RAM) 32 and various input/output terminals. These components are mixed and loaded on one chip. The SRAM 31 and the DRAM (Dynamic RAM) 32 will be generically called mixed RAM 30. The input/output terminals of the LSI 10 include the SDI (scalable Debug Interface) terminal, reset signal terminal, reset release signal terminal, ROM address, data, and chip select (CS) signal terminal, clock (CLK) signal terminal, and LED signal terminal. The SDI terminal is also called a debug terminal.

The CPU 20 has the CPU section 21 as a core of CPU, external memory interface 27, main memory (HSRAM) 28 as a high-speed RAM built in the CPU 20, and the peripheral bus interface 29 as a bus interface connection with peripheral devices. The CPU section 21 includes the CPU kernel 22, cache SRAM 23, cache control 24, CPU bus interface 25, and the debug support unit 26. The CPU 20 also includes various circuits, such as address control, PWM etc., which have been omitted from this figure.

The BOST (Built Out Self Test) circuit 40 mounted on the test board 1 includes the ROM 50 and relay 51 as a switch. Unlike BIST (Built in Self Test) which is structured directly in a device (in this case, the CPU built-in RAM mixed LSI 10) to be tested by a test pattern generator, a test analyzer or the like, the BOST circuit 40 is a technique such that a BIST circuit is placed on a test board and is mounted directly to a device to be tested. This technique solves a disadvantage of BIST such that a chip should be reproduced each time the BIST circuits are changed, and thus has an advantage that the BIST circuit can be programmed freely.

The ROM 50 is a memory for storing computer programme. This ROM 50 stores program executed by the CPU 20, which enables conduction of a self test of the mixed RAM 30 through the built-in CPU 20. The relay 51 is controlled based on the signal SL1 from the tester 60. The relay 51 can be controlled to establish a signal path between the ROM address, data, and chip select signal terminal of the LSI 10 and the ROM 50, or can establish a signal path between the ROM address, data, and chip select signal terminal of the LSI 10 and the ROM address, data, and chip select signal terminal of the tester 60.

The tester 60 is a normal tester which is capable of conducting various tests of built-in devices of the CPU built-in RAM mixed LSI 10. The tester 60 has the ROM address, data, and chip select signal terminal, clock signal terminal, LED signal terminal, SDI relevant signal terminal, and the terminal for outputting the signal SL1 for controlling switching of the relay 51. In the first embodiment, the tester 60 has a testable maximum frequency which is not less than the normal operating frequency of the CPU built-in RAM mixed LSI 10.

The difference between the apparatus shown in FIG. 1 and the conventional apparatus is that the ROM 50 and the relay 51 are provided in the form of the BOST circuit 40, and the tester 60 outputs the signal SL1 for controlling switching of the relay 51.

The procedure for testing the CPU built-in RAM 20 will be explained below with reference to the flowchart shown in FIG. 2.

Before starting the test, the ROM 50 and the relay 51 are mounted on the test board 1. At this time, the relay 51 is connected to the tester 60 (i.e. controlled to establish a signal path between the ROM address, data, and chip select signal terminal of the LSI 10 and the ROM address, data, and chip select signal terminal of the tester 60).

Subsequently, at step S100, the CPU section 21 of the CPU built-in RAM mixed LSI 10 and the HSRAM 28 for storing a self-test executing program are tested by using the tester 60, and a judgment is made as to whether these components are defective or non-defective. This procedure is performed to screen a defective LSI which may have been defective because of a defective CPU section 21 or HSRAM 28.

At step S110, power supply supplied from the tester 60 to the CPU built-in RAM mixed LSI 10 is turned OFF. The power is turned OFF to prevent the CPU built-in RAM mixed LSI 10 from being destroyed at the time of switching of the relay 51.

At step S120, reset signal is input from the tester 60 into the reset terminal of the CPU built-in RAM mixed LSI 10 so that the CPU built-in RAM mixed LSI 10 is reset. This is because in this case, since the CPU built-in RAM mixed LSI 10 reads contents of the ROM 50 when reset is released, the reset is released thereafter.

At step S130, the signal SL1 is output from the tester 60, whereby the relay 51 is connected to the ROM 50 (i.e. controlled to establish a signal path between the ROM address, data, and chip select signal terminal of the LSI 10 and the ROM 50). Thus, a connection between the ROM 50 and the LSI 10 is established, and the built-in CPU test executing program stored in the ROM 50 can be loaded to the main memory (HSRAM) 28 of the built-in CPU 20.

At step S140, power supply from the tester 60 to the CPU built-in RAM mixed LSI 10 is turned ON. Thus, it is possible now to test the built-in CPU 20.

At step S150, a reset release signal is input from the tester 60 to the reset terminal of the CPU built-in RAM mixed LSI 10. Thus, reset of the CPU built-in RAM mixed LSI 10 is released.

At step S160, since the reset has been released, the CPU test program stored in the ROM 50 is loaded into the main memory 28 of the CPU section 21.

At step S170, the CPU section 21 executes the CPU test program loaded into the main memory 28 so that the mixed RAM 30, namely, DRAM 32 and the SRAM 31 are self-tested by the normal operation of the built-in CPU 20.

In this self test, test data are written into respective bit cells of the mixed RAM 30 by the normal operation of the built-in CPU 20, and test data are read from the mixed RAM 30 by the normal operation of the built-in CPU 20. These written data and the read data are compared, and a signal that indicates the result of judgment as to whether the mixed RAM 30 is defective or non-defective is transmitted to the tester 60 based on the result of comparison. The signal that indicates the result of judgment may be a signal that lights an LED provided in the tester 60 when the components are defective.

At step S180, depending upon the signal that indicates the result of judgment, it can be decided at side of the tester 60 whether the CPU built-in RAM mixed LSI 10 is defective or non-defective and the test is ended.

Thus, in the first embodiment, test can be conducted by the self test of the normal operation through the CPU 20 in the CPU built-in RAM mixed LSI 10 upon the access between the built-in CPU 20 and the mixed memory 30. As a result, defective products which could not be conventionally screened can be screened, and thus the screening efficiency can be improved.

The second embodiment will be explained with reference to FIG. 1. In this second embodiment, objective bits of the mixed RAM 30 are tested by self test by means of a surround disturb pattern. In the second embodiment also, the tester 60 has a testable maximum frequency which is not less than the normal operating frequency of the CPU built-in RAM mixed LSI 10.

The structure of the apparatus of the second embodiment is the as that of the first embodiment. However, the contents of the test program stored in the ROM 50 are different from those in the first embodiment. The procedure at steps S100 to S160 of FIG. 2 is the same as that in the first embodiment. The test program to be executed at step S170 is different from that in the first embodiment.

As for surround disturb, when the respective bit cells of the mixed RAM are tested, test data are written into a bit cell to be tested, and reading/writing is executed with the normal operation of the CPU 20 on bit cells except for the bit to be tested, such as bit cells around the bit to be tested so that the bit cell to be tested is disturbed. The bit cell to be tested is tested as to whether or not it maintains the previously written test data by means of the disturbance. A test program which can execute such a surround disturb test is written into the ROM 50 mounted on the test board 1.

According to this test, the mixed RAM 30 in which a margin of a storage maintaining ability of a bit to be tested is small can be tested, and a defective product with an insufficient margin of the storage maintaining ability, which cannot be screened and is defected by the normal disturbing operation, can be screened in the test by means of the tester 60. As a result, the screening efficiency can be improved.

The third embodiment of the present invention will be explained now. In this third embodiment, the ROM is not directly mounted onto the test board 1, but a ROM socket is mounted. The aforementioned ROM 50 in which a predetermined test program is previously stored is fixed into this ROM socket.

Thus, if the test program of the CPU built-in RAM mixed LSI 10 is changed, only a simple and easy work is required. Namely, the ROM fixed into the ROM socket is removed, and another ROM in which an appropriate program is stored is fixed into the ROM socket.

Figure 3:
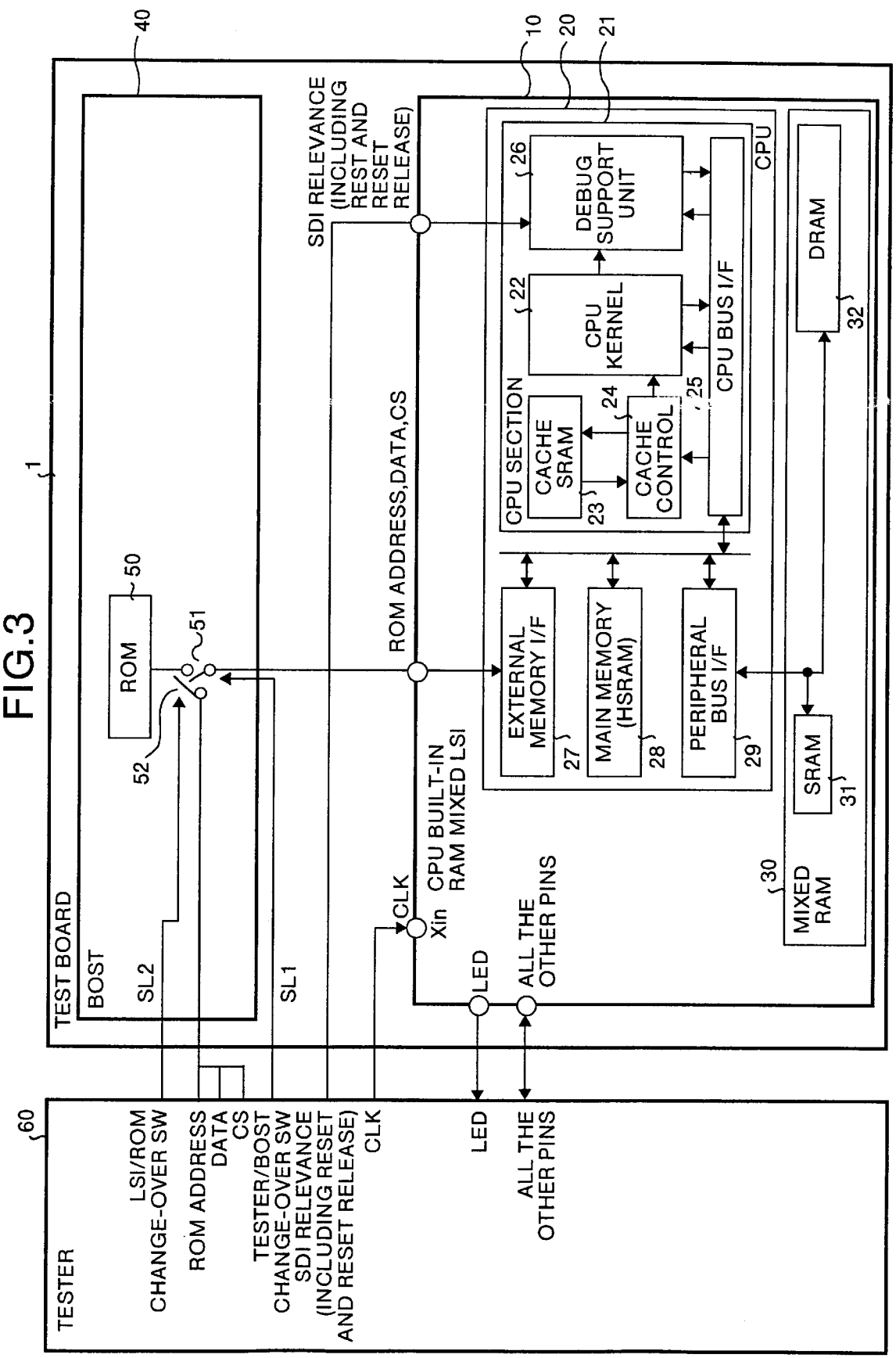
FIG. 3 is a block diagram showing a structure of the test apparatus of the CPU built-in RAM mixed LSI according to a fourth embodiment of the present invention.

The fourth embodiment will be explained with reference to FIG. 3. In this fourth embodiment, the switch 52 is provided in the BOST circuit 40 on the test board 1. By controlling this switch 52, the tester 60 can access directly to the ROM 50. As a result, the ROM 50 can be tested.

The switch 52 can be controlled to establish a signal path between the ROM address, data, and chip select signal terminal of the tester 60 and the ROM 50, or can establish a signal path between the ROM address, data, and chip select signal terminal of the tester 60 and the ROM address, data, and chip select signal terminal of the LSI 10. When the ROM 50 is to be tested, the tester 60 controls the switch 52, by outputting the signal SL2, so as to establish a signal path between the ROM address, data, and chip select signal terminal of the tester 60 and the ROM 50. This makes it possible to test the ROM 50.

Figure 4:
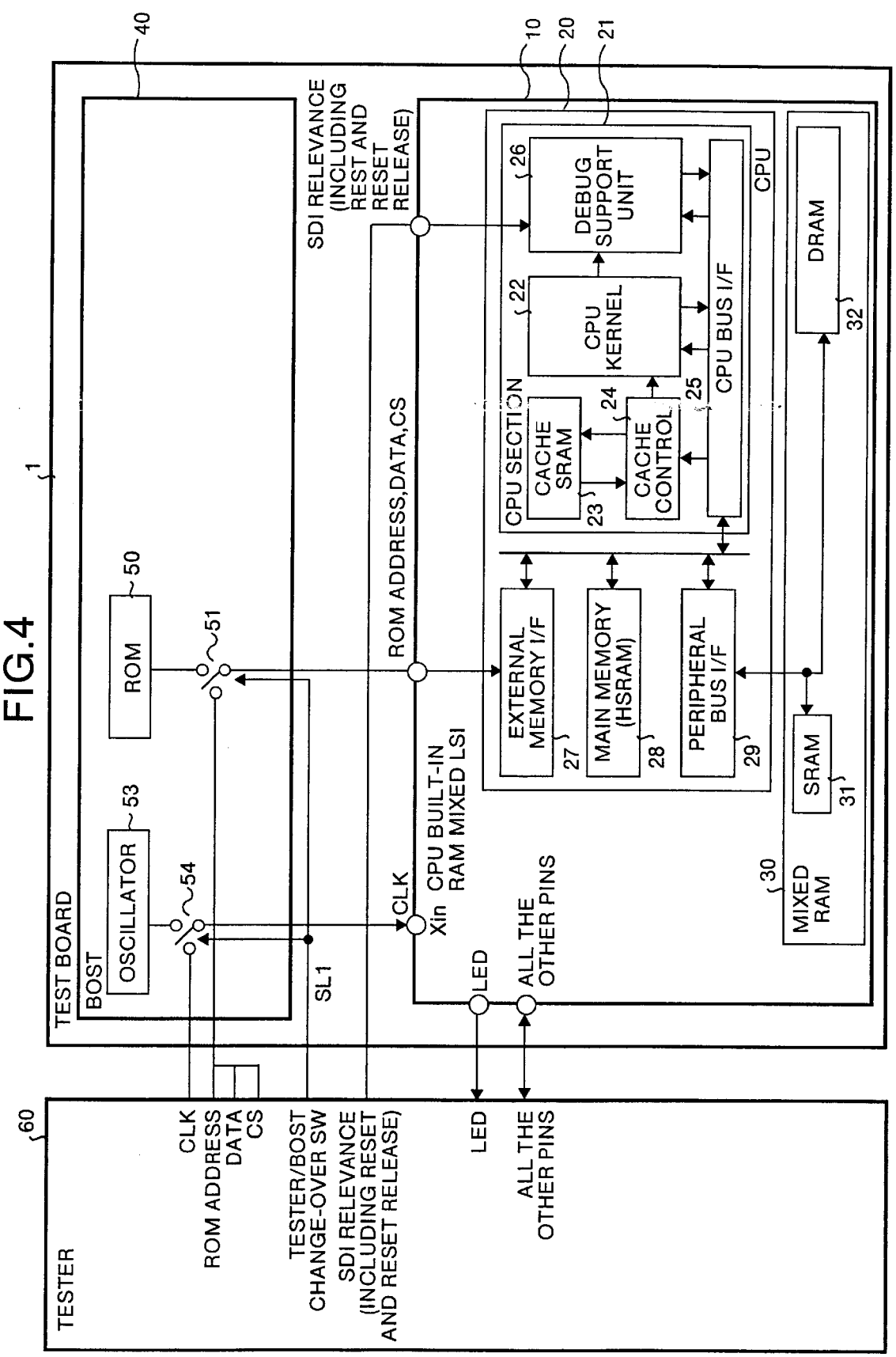
FIG. 4 is a block diagram showing a structure of the test apparatus of the CPU built-in RAM mixed LSI according to a fifth embodiment of the present invention.

The fifth embodiment will be explained with reference to FIG. 4. In this fifth embodiment, the oscillator 53 and the relay 54 are provided in the BOST circuit 40 on the test board 1. The oscillator 53 generates a clock signal having a frequency that is equal to the frequency of the CPU 20 during normal operation. The relay 54 can provide the clock signal output by the tester 60 or the clock signal generated by the oscillator 53 to the clock terminal CLK of the CPU built-in RAM mixed LSI 10. This relay 54 can be controlled based on the signal SL1 that controls the relay 51.

Figure 2:
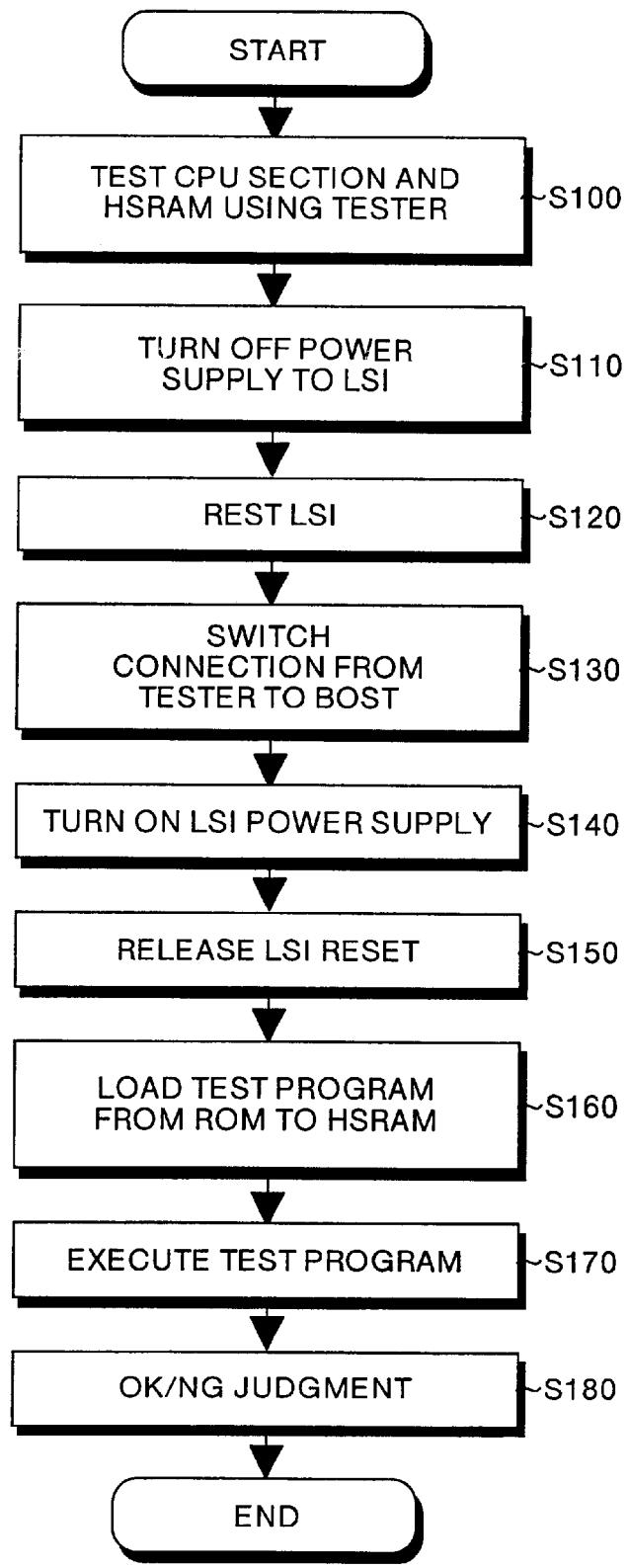
FIG. 2 is a flowchart showing a test procedure of the first embodiment.

The test procedure of the fifth embodiment is approximately the same as that shown in FIG. 2. When the connection to the tester 60 is switched into the connection to the BOST circuit 40 at step S130, the relays 51 and 54 are turned to the BOST circuit side using the signal SL1. Thus, both the ROM 50 and the oscillator 53 are simultaneously connected to the CPU built-in RAM mixed LSI 10.

Thus, the oscillator 53 generates a clock signal with a desired frequency and this clock signal is input into the CPU built-in RAM mixed LSI 10. As a result, the mixed RAM 30 can be tested without depending on a performance of the tester 60 (testable maximum frequency), and thus the mixed RAM 30 can be self-tested by the normal operation of the built-in CPU 20.

Figure 5:
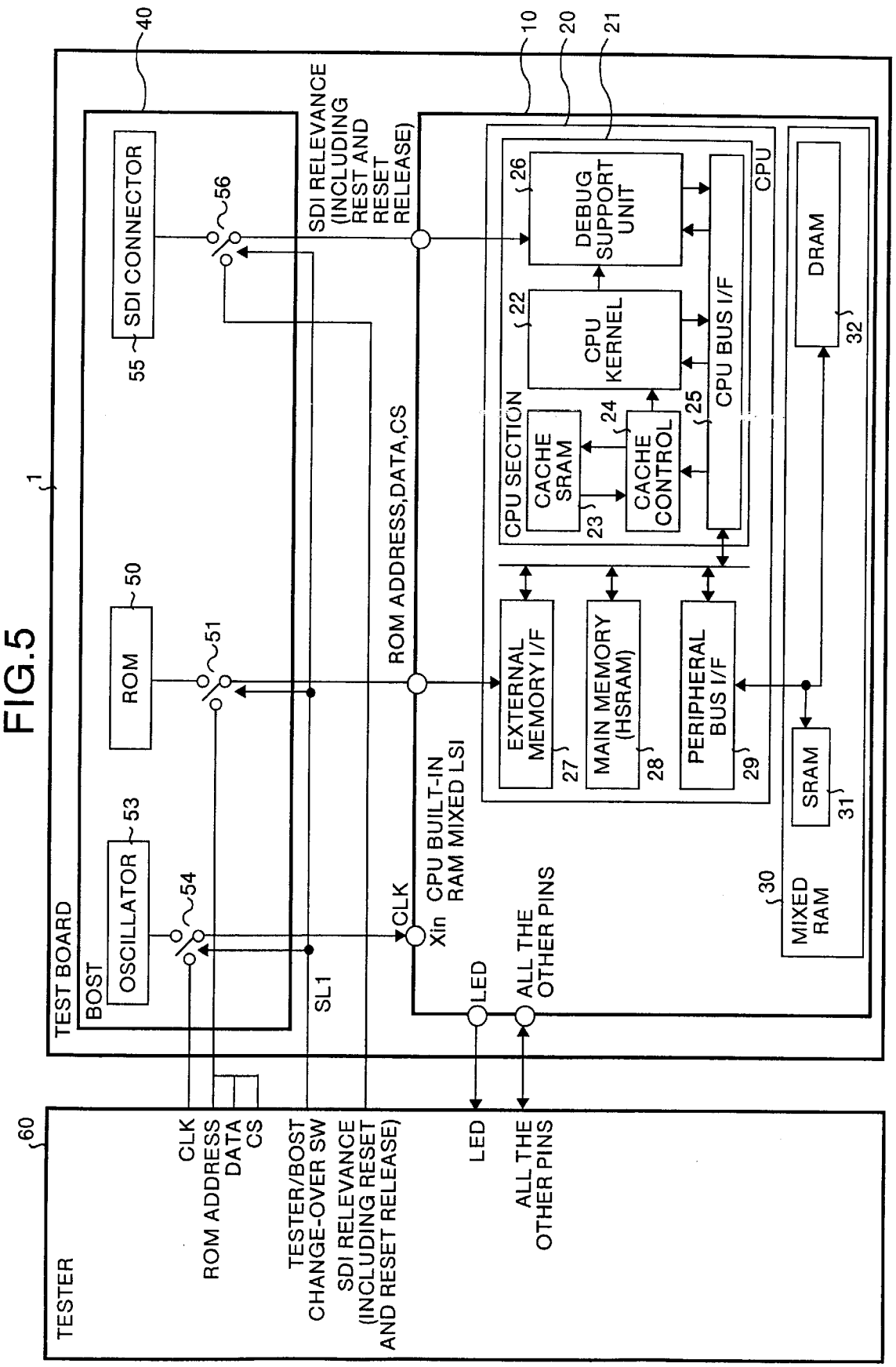
FIG. 5 is a block diagram showing a structure of the test apparatus of the CPU built-in RAM mixed LSI according to a sixth embodiment of the present invention.

The sixth embodiment will be explained with reference to FIG. 5. In this sixth embodiment, the debug tool connector ("SDI connector") 55, and the relay 56 are provided in the BOST circuit 40 on the test board 1 in addition to the structure shown in FIG. 4. The SDI connector 55 is a debug interface. The relay 56 is controlled to establish a signal path between the SDI relevant signal terminal of the tester 60 and the SDI connector, or can establish a signal path between the SDI connector and the SDI relevant signal terminal of the CPU built-in RAM mixed LSI 10. This relay 56 can be controlled based on the signal SL1 that controls the relays 51 and 54. A debug tool (not shown) is connected to the SDI connector 55, and the SDI relevant signal from the debug tool can be input into the debug support unit 26 via the SDI relevant terminal of the CPU built-in RAM mixed LSI 10.

When there is a bug in the test program of the CPU built-in RAM mixed LSI 10, the relay 56 is switched to establish a connection with the SDI connector 55, and the test program is debugged by the debug tool connected to the SDI connector 55.

Thus, the test program of the CPU built-in RAM mixed LSI 10 to be loaded into the HSRAM 28 can be debugged on the test board 1 by the debug tool connected to the SDI connector 55. Therefore, when there is a bug in the test program, that test program can be debugged using the test board 1.

It should be noted that the above-explained six embodiments may be combined. For example, the surround disturb test may be conducted in the embodiment shown in FIG. 5. In another example, the switch 52 provided in the apparatus shown in FIG. 3 may be provided in the apparatus shown in FIG. 4 or FIG. 5.

Furthermore, it has been explained in the sixth embodiment that the relays 51, 54 and 56 are controlled using one signal i.e. signal SLI. However, separate signals may be used to control the respective relays.

As explained above, according to the present invention, first, the switching unit is controlled to establish a connection between the ROM and the LSI and the self test program is loaded from the ROM into the main memory of the built-in CPU of the LSI. Thus, the self test can be conducted by the CPU of the LSI. Since the test can be conducted by the CPU in the LSI, a defective product which could not be conventionally screened can be screened. As a result, the screening efficiency can be improved easily and simply at low cost. Therefore, the test accuracy of the self test can be improved.

Furthermore, the self test is conducted by the surround disturb pattern. As a result, the mixed RAM in which a storage maintaining margin of the bit to be tested is small can be tested. Thus, a defective product, which cannot be screened conventionally by the tester and has an insufficient margin of the storage maintaining ability caused by a disturbing operation of the normal operation, can be screened, and thus the screening efficiency can be improved.

Furthermore, the ROM socket is mounted onto the test board and the ROM is detachable from the socket. Therefore, even if the test program is changed, only ROM needs to be changed, so that operation is easily and simply.

Furthermore, the switch which can establish a connection between the tester and the ROM is mounted onto the test board. As a result, the ROM can be tested.

Furthermore, the oscillator that generating a clock signal and the clock switching unit are mounted onto the test board. Thus, a clock signal with a desired frequency can be input from the oscillator to the CPU built-in RAM mixed LSI. As a result, the mixed RAM can be tested without depending on the performance of the clock signal of the tester.

Furthermore, the connector for connecting the debug tool and the debug signal switching unit are mounted onto the test board. As a result, the test program can be debugged using the debug tool.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A test apparatus for a CPU built-in RAM mixed LSI for self-testing mixed RAM of the CPU built-in RAM mixed LSI mounted onto a test board using a tester, including a test board on which are mounted a ROM in which a self test program for conducting a self test by access between a built-in CPU and the mixed RAM of the CPU built-in RAM mixed LSI is stored, and a ROM switching unit for switching between a signal from the tester to the CPU built-in RAM mixed LSI and a signal from the ROM to the CPU built-in RAM mixed LSI and inputting the switched signal into signal terminals of the CPU built-in RAM mixed LSI, wherein, after the ROM switching unit is switched to a ROM side by using the tester, the self test program is loaded from the ROM into a main memory connected to the built-in CPU for conducting the self test.

2. The test apparatus according to claim 1, wherein the self test includes a test including a surround disturb pattern.

3. The test apparatus according to claim 1 further comprising a socket into which said ROM can be detachably fixed, mounted on said test board.

4. The apparatus according to claim 1 further comprising a second switching unit for establishing a connection between said tester and said ROM.

5. The apparatus according to claim 1 further comprising:
an oscillator for generating a clock signal desired frequency; and
a clock switching unit for connecting a clock signal output by said tester to the CPU built-in RAM mixed LSI, and for connecting a clock signal output by said oscillator to the CPU built-in RAM mixed LSI, wherein said oscillator and said clock switching unit are mounted on said test board.

6. The apparatus according to claim 1 further comprising:
a debug tool connector for connecting a debug tool; and
a debug signal switching unit connecting a debug signal output by said tester to the CPU built-in RAM mixed LSI, and connecting a connection between a debug signal output by said debug tool connected to said connector and the CPU built-in RAM mixed LSI, wherein said debug tool connector and said debug signal switching unit are mounted on said test board.

7. A method of self-testing a mixed RAM of a CPU built-in RAM mixed LSI mounted onto a test board using a tester, the method comprising:
mounting a ROM on a test board, wherein said ROM stores a self test program for conducting a self test by access between a built-in CPU and the mixed RAM of the CPU built-in RAM mixed LSI;
mounting a ROM switching unit on the test board, wherein said ROM switching unit switches between a signal from said tester to said CPU built-in RAM mixed LSI and a signal from said ROM to said CPU built-in RAM mixed LSI and receives the switched signal into signal terminals of said CPU built-in RAM mixed LSI; and
switching said ROM switching unit to said ROM side using said tester and loading the self test program from said ROM into a main memory connected to said built-in CPU for conducting the self test.

8. A test apparatus for self-testing a mixed RAM of a CPU built-in RAM mixed LSI, said apparatus comprising:
a tester that includes
a signal generation unit which generates at least a switching signal;
a switching signal output terminal through which the switching signal is output; and
a signal output terminal through which a signal is output,
a test board on which is mounted
a ROM that stores a computer program which, when executed, conducts the self test by access from said CPU of said LSI to said mixed RAM; and
a switching unit which, under control of the switching signal output from said switching signal output terminal, establishes a signal path between said LSI and one of said signal output terminal of said tester and said ROM, wherein said CPU of said LSI loads the computer program stored in said ROM into a main memory when said switching unit establishes a signal path between said LSI and said ROM.

* * * * *